July 11, 1961    G. BUNGE ET AL    2,992,137
COMPOSITE BEARING
Filed Oct. 26, 1955

INVENTORS
GERHARD BUNGE
EDUARD R. HONAK.
BY Mock & Blum
ATTORNEYS.

United States Patent Office 2,992,137
Patented July 11, 1961

2,992,137
COMPOSITE BEARING
Gerhard Bunge, Sigmaringendorf, Hohenzollern, and Eduard R. Honak, Bruhl, near Koln, Germany, assignors to Fuerstlich Hohenzollernsche Huettenverwaltung, Laucherthal, Germany, a company of Germany
Filed Oct. 26, 1955, Ser. No. 542,806
9 Claims. (Cl. 117—132)

The present invention relates to composite bearings.

In machine and engine construction, composite bearings have been known for many decades in which a thin layer of bearing metal suitable for the sliding effect is carried on a supporting shell capable of supporting a load. The bearing metal is usually cast on, sintered on or galvanically applied to the supporting shell. More recently, there have been produced so-called synthetic resin composite bearings in which a thin layer of synthetic resin is applied to a foundation metal. For improving the properties of the synthetic resin surface layer of such synthetic resin composite bearings, it has already been proposed to add fillers, such as, for example, mica, to the synthetic resin, whereby a certain porosity of the synthetic resin surface layer is produced.

In contradistinction to such synthetic resin composite bearings in which the layer presenting the glide surface of the bearing wholly or predominantly consists of resin, it is a purpose of the present invention to provide a composite bearing in which the bearing surface is of a predominantly metallic character notwithstanding the fact that resinous material is used as a binder in forming the metallic bearing surface and adhering the same to the supporting metal shell of the bearing. Due to its greatly facilitated bode of application the compound bearing according to the invention is an improvement over prior art compound bearings having a sintered, cast or galvanically applied glide layer on the supporting plain metal shell.

Figure 1:
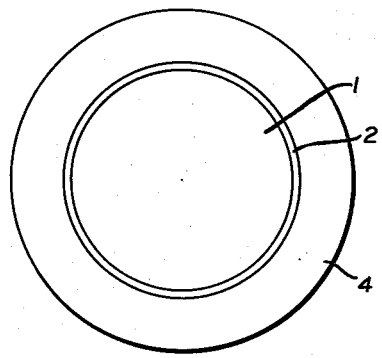
Figure 2:
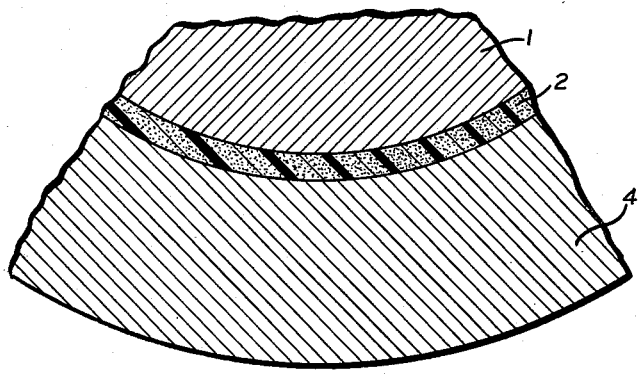

The preferred form of composite bearing is shown in the attached drawing, wherein:

FIGURE 1 is a side elevational view of the bearing fitted on a shaft, which is shown in end elevation, and FIGURE 2 is an enlarged detailed cross-sectional view of the bearing showing the layer composition thereof.

According to the present invention there is provided a composite bearing comprising a supporting shell 4 composed of metallic material from the class comprising copper, light metal, steel, copper alloys and light metal alloys, and a thin, film-like glide layer 2 comprising finely divided particles of a metallic material from the class comprising iron, lead, tin, copper, and alloys of said metals, such as cast iron, white metal and bronze, these metals or alloys being preferably partially replaced by their oxides, and mixtures of said metals, oxides and alloys, said glide layer being adhered to said supporting shell by means of a hardened resinous binder. The bearing is shown in the drawing as fitted on a shaft or axle 1.

Experiments carried out in this connection have shown that metal powder or fine metal shavings, for example, of iron, cast iron, lead, tin, copper, white metal, bronze or other bearing metals of different composition or mixtures of these metal powders with one another may be applied in a simple manner by using known thermosetting or cold-hardening synthetic resins, such as, for example, phenol-aldehyde resins, carbamide resins, aminotriazine resins, polyurethane resins, epoxide resins, hardenable alkyd resins, silicones, perhaps in admixture with one another and/or with thermoplastic resins. The synthetic resin or resin mixture employed in accordance with the invention merely serves the purpose of accomplishing the cohesion of the fine metal particles with one another and with the metal supporting shell, without modifying them or acting on them chemically. The production of good sliding properties is effected exclusively by the choice of a fine-particled metal substance of proper nature, structure and composition.

Such composite bearings have a surface layer with such a heat-conducting capacity that the heat dissipation is practically equally as good as that of plain metal bearings. On account of the heterogeneous construction of the sliding surface, the particular properties of the metal powders actually being used are supplemented by the sliding properties of the synthetic resin. For example, when using lead powder or tin powder, the advantage of an outstanding embedding capacity is derived from the resin, the metal powder itself yielding the desirable good heat conduction. If overheating occurs due to inadequate lubrication of parts of the bearing, extremely fine meal particles are formed from metals of low melting point, and the film produced thereby is able for a short time to take over the function of an emergency lubrication. When cast iron particles and bronze particles are embedded in the synthetic resins, they increase the stability and the supporting capacity of the bearings. It is therefore possible to manufacture bearings which are able to endure the strongest dynamic stresses, for example, in internal combustion engines. It has been found most expedient to use a grain size of the metallic material between 0.01 and 1.00 mm., which may exist as a powder, i.e. with a rounded surface, and also as chippings, very fine flakes and the like.

The metals or metal alloys may be advantageously partially replaced by their oxides.

The bearings are manufactured in the simplest manner possible. A mixture of metal powder or fine metal chippings or shavings and a synthetic resin is applied in liquid or paste-like form in one or more thin layers to the surface facing the bearing surface proper of a metallic supporting shell, for example, of steel, bronze, brass, cast iron, light metal or a similar metal, the shell surface to be covered, having been subject to any required pretreatment such as cleaning, roughening or phosphatising. Then, either each separate layer is independently dried, or the layers which are applied are jointly dried, with a possible partial intermediate drying of the separate layers, and cured or hardened, if necessary, at elevated temperature, according to the nature of the resinous adhesive which is employed. Particularly favourable results are obtained when the sliding layer contains metal powder or fine metal shavings, on the one hand, and synthetic resin, on the other hand, in a quantitative ratio of from 50 to 95 percent by weight of the former and from 50 to 5 percent by weight of the latter.

The application of the liquid or pasty synthetic resin adhesive by itself, or of the mixture of adhesive and metal particles, may be effected by conventional and known processes such as painting, spraying, flame-spraying or dipping. The adhesive may, however, also be applied initially without metal powder or metal shavings and the corresponding proportion of metal particles introduced into the adhesive layer by sprinkling, blowing, or bombardment, for example, by means of electrostatic charging.

A mixture composed in the dry state as follows has proved to be particularly favourable: 85–95 percent by weight of metal and 5–15 percent by weight of hardened adhesive.

Mixtures comprising 90% of lead-bronze powder consisting of 25% lead and the remainder copper and 10% of hardened adhesive substance, or 92% of lead powder or lead-tin powder and 8% of hardened adhesive substance have also been used with satisfactory results.

Non-metallic substances which are known to improve the sliding properties under certain conditions, such as graphite or molybdenum sulphide, may be added in proportions as high as 10% by weight according to the nature of the stressing.

Furthermore, instead of a unitary metallic support, it is possible to use a supporting shell which consists of two or more metal layers, for example, a steel-bronze compound bearing, whereby, in conjunction with the thin sliding surface layer consisting of metal powder and synthetic resin a compound or multi-layer bearing comprising three or more layers is obtained.

The total thickness of the slide surface of the compound bearing may vary within wide limits, and favourable results have been produced on the one hand with thin layers which are only 0.01 mm. thick, and on the other hand with comparatively thick layers of 1.0 mm. Mean layer thicknesses of 0.1–0.4 mm. have generally proved to be particularly advantageous.

The curing or hardening of the sliding surface layer is usually effected by heating, but may with certain synthetic resins be accomplished by long storage or by the use of catalysts. If necessary, the hardened layers may be subjected to a mechanical after-treatment, such as turning or grinding.

The composite bearings with the surface layer containing a metallic powder are characterized, as already mentioned, by a particularly high wearing resistance even when subjected to severe stresses. For example, during the examination of such a bearing in a bearing testing machine, it has been shown that neither the bearing nor the shaft shows appreciable traces of wear, even with a load or more than 400 kg./cm.$^2$. The sliding surfaces containing metal powder may be used not only for the manufacture of composite bearings of the usual form, but also for the manufacture of sliding surfaces of any desired form.

What we claim is:

1. A composite bearing comprising a metallic supporting base, a film-like glide layer the thickness of which is in the range of 0.1–1 mm. and which is formed (a) by finely divided metallic material having low sliding friction, high mechanical strength, high wear resistance, toughness and good heat conductibility, and being selected from the group consisting of iron, lead, tin, copper and (b) by a hardened curable resinous binder for binding said finely divided particles to each other and causing the glide layer to adhere to the supporting metallic base; the weight ratio of said finely divided metallic material to said resinous binder being in the range of 1:1 to 95:5.

2. A composite bearing as claimed in claim 1, in which part of the finely divided metallic material is replaced by an alloy of metals selected from said group of metallic materials.

3. A composite bearing as claimed in claim 1, in which the grain size of said finely divided particles of metallic material is between 0.01 and 1 mm.

4. A composite bearing as claimed in claim 1, in which the film-like glide layer has been subjected to a mechanical finishing operation.

5. A composite bearing comprising a metallic supporting base, and a film-like glide layer the thickness of which is in the range of 0.1–1 mm. and which is formed by finely divided metallic material having low sliding friction, high mechanical strength, high wear resistance, toughness and good heat conductibility, and being selected from the group consisting of iron, lead, tin, copper, and by a hardened curable resinous binder for binding said finely divided particles to each other and causing the glide layer to adhere to the supporting base, the weight ratio of said finely divided metallic material to said resinous binder being in the range of 1:1 to 95:5, said curable resinous binder being selected from the group consisting of polyurethane resins, epoxide resins, curable alkyd resins, silicones, mixtures of these resins with each other and mixtures of said resins with a thermoplastic resin.

6. A composite bearing as claimed in claim 5, in which part of the finely divided metallic material is replaced by an alloy of metals selected from said group of metallic materials.

7. A composite bearing as claimed in claim 5, in which the weight ratio of said finely divided metallic material to said resinous binder is in the range of 85:15 to 95:5.

8. A composite bearing comprising a metallic supporting base and a bearing layer thereon, said layer comprising a mixture of metallic particles and a thermosetting resinous binder for binding said particles to each other and for causing said layer to adhere to said base, said metallic particles being selected from the group consisting of iron, lead, tin, copper and alloys of said metals, the weight ratio of said particles to said binder in said layer being substantially between 85:15 and 95:5.

9. A composite bearing comprising a metallic supporting base and a bearing layer disposed thereon and adhering thereto, said bearing layer comprising a mixture of metallic particles and a thermosetting resinous binder binding said particles to each other and causing said layer to adhere to said base, said metallic particles being composed of at least one metal selected from the group consisting of iron, lead, tin, copper and alloys of said metals, the weight ratio of said particles to said binder being substantially between 1:1 and 95:5.

References Cited in the file of this patent

UNITED STATES PATENTS

| | | |
|---|---|---|
| 1,054,265 | Baekeland | Feb. 25, 1913 |
| 2,219,054 | Palm et al. | Oct. 22, 1940 |
| 2,431,921 | Cook | Dec. 2, 1947 |
| 2,581,301 | Saywell | Jan. 1, 1952 |
| 2,691,814 | Tait | Oct. 19, 1954 |
| 2,695,425 | Stott | Nov. 30, 1954 |
| 2,748,099 | Bruner et al. | May 29, 1956 |
| 2,772,930 | Schubert | Dec. 4, 1956 |